(12) United States Patent
Ortega

(10) Patent No.: US 7,661,761 B1
(45) Date of Patent: Feb. 16, 2010

(54) MOTORCYCLE BACKREST ASSEMBLY

(76) Inventor: Alejandro Ortega, 15053 Fairgrove Ave., La Puente, CA (US) 91744

( * ) Notice: Subject to any disclaimer, the term of this patent is extended or adjusted under 35 U.S.C. 154(b) by 0 days.

(21) Appl. No.: 12/328,932

(22) Filed: Dec. 5, 2008

Related U.S. Application Data

(60) Provisional application No. 60/992,541, filed on Dec. 5, 2007.

(51) Int. Cl.
*A47D 1/10* (2006.01)
*A47C 7/02* (2006.01)
*B60N 2/02* (2006.01)
*B62J 9/00* (2006.01)

(52) U.S. Cl. .................... 297/352; 297/230.1; 297/353; 297/373; 280/288.4

(58) Field of Classification Search .............. 297/230.1, 297/230.14, 373, 353, 352; 280/288.4, 751, 280/727
See application file for complete search history.

(56) References Cited

U.S. PATENT DOCUMENTS

| 4,313,639 | A | * | 2/1982 | Ware ........................... 297/366 |
| 4,993,731 | A | * | 2/1991 | Fuller .......................... 280/202 |
| 5,667,232 | A | * | 9/1997 | Gogan et al. ................. 280/202 |
| D394,234 | S | * | 5/1998 | Gogan et al. ................ D12/114 |
| 5,779,303 | A | * | 7/1998 | Kuelbs et al. ........... 297/215.11 |
| 6,983,992 | B2 | * | 1/2006 | Oomori ....................... 297/357 |
| 7,175,220 | B2 | * | 2/2007 | Kashiwagi et al. ....... 296/65.03 |

\* cited by examiner

*Primary Examiner*—Milton Nelson, Jr.
(74) *Attorney, Agent, or Firm*—Kenneth L Tolar

(57) ABSTRACT

A motorcycle backrest assembly includes a pair of side plates each for mounting on either the left or right side of the motorcycle's rear fender. A receiver is securable to each plate for adjustably receiving one of two side rails depending from a backrest. Each receiver is angularly adjustable to vary the position of the backrest. The entire assembly can be quickly removed from the motorcycle and stored, if desired.

6 Claims, 3 Drawing Sheets

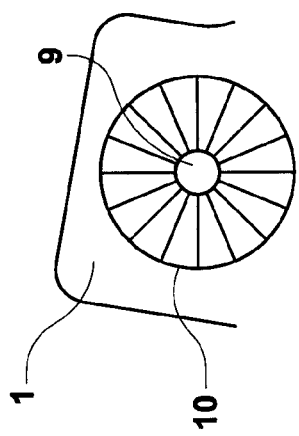
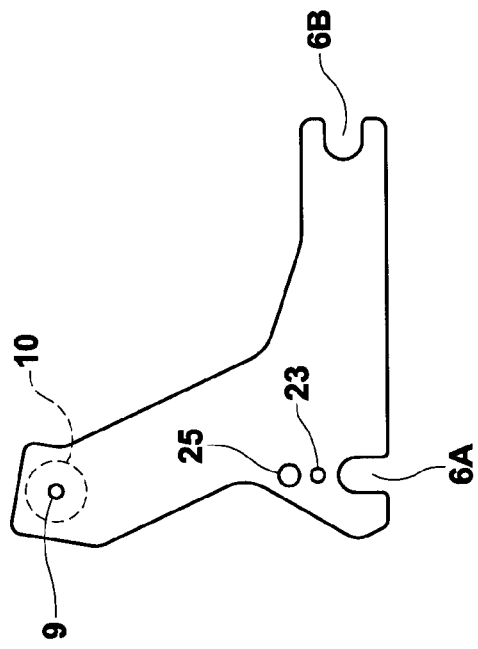
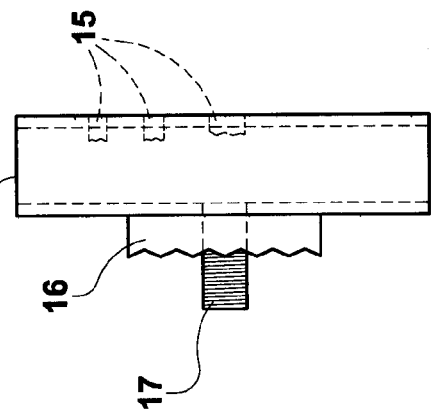
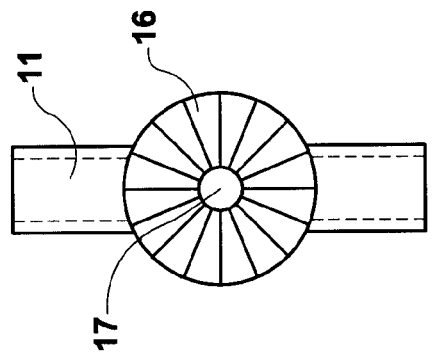

MOTORCYCLE BACKREST ASSEMBLY

CROSS REFERENCE TO RELATED APPLICATIONS

This application is entitled to the benefit of provisional application No. 60/992,541 filed on Dec. 5, 2007, the specification of which is incorporated herein by reference.

BACKGROUND OF THE INVENTION

The present invention relates to a removable backrest assembly for a motorcycle.

DESCRIPTION OF THE PRIOR ART

Motorcycles typically include a bench-style driver's seat with no backrest. Riding for extended periods of time on such seats can be uncomfortable, and possibly injurious, due to the lack of lower back support. A review of the prior art reveals a myriad of motorcycle backrests that are purportedly designed to address this problem. For example, U.S. published patent application no. 20070181757 filed on behalf of Sharpe et al. discloses a quick-release bracket for securing a backrest to a motorcycle including a pair of base plates each having a vertical recess at one end and a horizontal recess at an opposing end. A spring-biased, slidable latch is movable over the vertical recess to secure the bracket to a post on the motorcycle fender.

U.S. Pat. No. 6,840,704 issued to Monson discloses a quick-release system for motorcycle backrests including a plate having a pair of notches configured to receive bolt heads positioned on the motorcycle. Adjacent one of the notches is a spring-biased pin for retaining the bolt head within the recess.

U.S. Pat. No. 6,991,290 issued to Wiertzema discloses a detachable motorcycle backrest system.

U.S. Pat. No. 3,822,917 issued to George discloses a pivotally-adjustable backrest for cycles.

U.S. Pat. No. 6,983,992 issued to Oonmori discloses a motorcycle backrest.

U.S. Pat. No. 5,779,303 issued to Kuelbs et al. discloses a support bracket for a motorcycle backrest that is similar to that disclosed in the published patent application filed on behalf of Sharpe and the patent issued to Monson.

As indicated above, a myriad of motorcycle backrest assemblies exist in the prior art. However, none of the above-described devices include plates in combination with a height and angularly-adjustable backrest according to the present invention. Furthermore, the unique design allows varying types of backrests to be interchangeably mounted on the motorcycle without removing the plates.

SUMMARY OF THE INVENTION

A motorcycle backrest assembly includes a pair of side plates each for mounting on either the left or right side of the motorcycle's rear fender. A receiver is securable to each plate for adjustably receiving one of two side rails depending from a backrest. The plate includes means for adjusting the angle of each receiver to vary the position of the backrest. The entire assembly can be quickly removed from the motorcycle and stored, if desired.

It is therefore an object of the present invention to provide a backrest assembly for a motorcycle that enhances the comfort of a motorcycle rider.

It is another object of the present invention to provide a backrest assembly that is both angularly and height-adjustable.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is an isolated view of a side plate.

FIG. 4 is a front view of a receiver.

FIG. 5 is a side view of the receiver of FIG. 4.

FIG. 6 is an isolated view of the serrated adjustment disc.

DESCRIPTION OF THE PREFERRED EMBODIMENT

Figure 1:
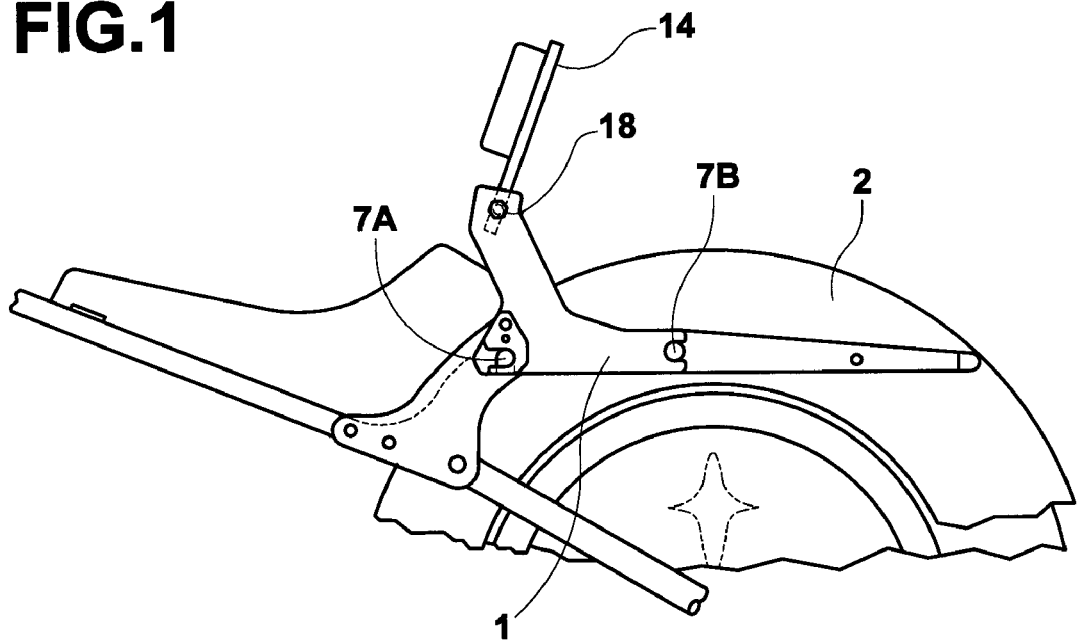
FIG. 1 is a side view of the backrest assembly of the present invention installed on a motorcycle.
Figure 2:
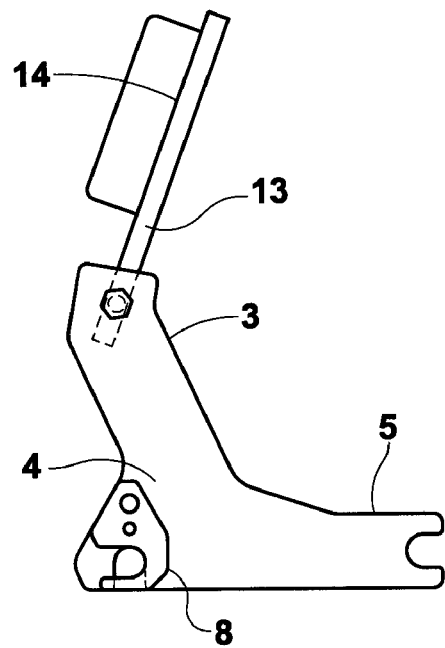
FIG. 2 is an isolated view of the backrest assembly.
Figure 7:
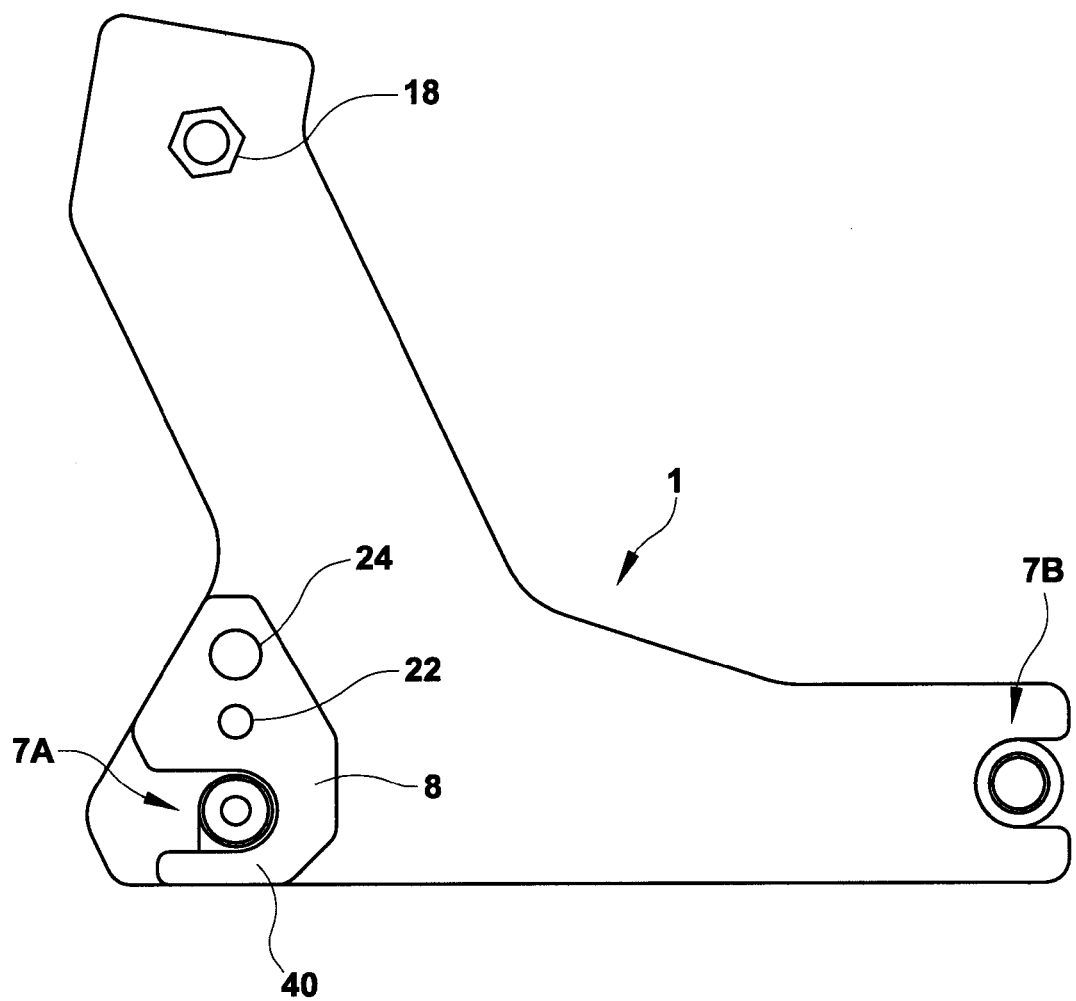
FIG. 7 is an enlarged view of the plate of FIG. 3.

A motorcycle backrest assembly includes a pair of side plates 1 each for mounting on either the left side or the right side of the motorcycle's rear fender 2. Each plate is substantially triangular and includes an upper end 3 and a lower end 4 with a stabilizing arm 5 extending therefrom. On the inner surface of each plate, proximal the upper end thereof, is a serrated adjustment disc 10 having a central passageway 9. Both the lower end and the distal end of the stabilizing arm each include a notch 6A, 6B that grips either a front 7A or a rear mounting post 7B, respectively, which in turn are attached to the fender 2. Adjacent the notch 6A at the lower end is a rotary, release latch 8 for gripping the post 7A to secure the plate to the fender. The release latch includes a pivot pin 22 that fits within an aperture 23 formed on the plate immediately above the notch 6A. The latch rotates about the central axis of the pivot pin 22 to move a gripping portion 40 of the latch toward and away from the mounting post 7A. Immediately above the pivot pin is a spring-biased locking knob 24 that releasably fits within another aperture 25 adjacent to aperture 23. By pulling the knob from aperture 25, a user can release and rotate the latch.

The front mounting post 7A preferably includes a single groove for firmly accommodating the latch and notch 6A. The rear post 7B, however, preferably includes at least two grooves, one of which accommodates the notch 6B. The other groove can receive a mounting plate from an accessory passenger backrest assembly of the type known in the prior art.

The backrest assembly also includes a pair of receivers 11 each of which fastens to a respective side plate. Each receiver includes an elongated, hollow tube 12 having an open upper end that is configured to receive one of two opposing side rails 13 on an existing accessory motorcycle backrest 14. The receiver includes multiple apertures 15 for aligning with similar apertures on the side rail. Removable, height-adjustment fasteners are inserted into the aligned apertures allowing the effective height of the backrest to be varied. Positioned on the outer surface of each receiver is a serrated annulus 16 with a bolt 17 extending therefrom. The annulus 16 intermeshes with the serrated disc 10 to incrementally fix the receiver at a select angle. The bolt passes through the central passageway 9 and an acorn nut 18 is fastened thereto to secure the receiver to the plate at the select angle.

To install the assembly, a user fastens each plate to the motorcycle fender by first positioning the notch on the stabilizer arm about a rearwardly-mounted post. The release latch is rotated to expose the notch on the lower end, which is positioned over the front post; the locking knob is secured within the aperture 25 thereby locking the plate on the fender. Each receiver is then attached to one of the side plates by inserting the bolt through the passageway and securing the acorn nut. Each of the two backrest side rails is inserted into one of the receivers and is fixed at a desired elevation using the height-adjustment fasteners. The rider can easily adjust the angle of the backrest by loosening the acorn nuts, pivoting the backrest to a desired position and re-tightening the nuts. The entire assembly is removed by simply pivoting the rotary latches and lifting the assembly from the mounting posts.

The above-described device is not limited to the exact details of construction and enumeration of parts provided herein. For example, any existing accessory item for a motorcycle having risers, i.e., a luggage rack, can be attached to the receivers of the present invention. Any existing backrest or a specifically designed backrest can also be used. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A motorcycle backrest comprising:
    a pair of side plates, each of said plates having an outer surface, an inner surface, an upper end and a lower end with a stabilizing arm extending from said lower end, said lower end and said stabilizing arm each including a notch, the notch on said stabilizing arm receiving a rear mounting post secured to a motorcycle fender;
    a rotary, releasable latch adjacent the notch on said lower end that releasably grips a front mounting post secured to the motorcycle fender to anchor the plate thereto;
    a serrated adjustment disc on the inner surface of each of said plates, said disc having a central passageway;
    a pair of elongated, hollow receiver tubes each having an outer surface and an open upper end;
    a serrated annulus on the outer surface of each of said tubes that intermeshes with said serrated adjustment disc to incrementally fix the tubes at a select angle;
    a backrest having a pair of side rails depending therefrom, each of said side rails received within the open upper end of one of said tubes;
    means for securing said side rails at a select height relative to said tubes.

2. The motorcycle backrest according to claim 1 wherein said means for securing said side rails at a select height relative to said tubes comprises:
    multiple apertures on said side rails;
    multiple apertures on said tubes;
    fasteners received within a select number of apertures on said tubes and a select number of apertures on said rails that are aligned therewith for fixing the side rails at the select height.

3. The motorcycle backrest according to claim 2 further comprising:
    a bolt extending from said annulus and passing through said passageway;
    a nut fastened to said bolt that secures said tube to said plate at the select angle.

4. The motorcycle backrest according to claim 1 wherein said front mounting post includes a circumferential indention for accommodating said notch on said lower end and said releasable latch.

5. The motorcycle backrest according to claim 4 wherein said rear mounting post includes at least two grooves, one of said grooves for accommodating said notch on said stabilizing arm, another of said grooves for accommodating a mounting plate from a passenger backrest assembly.

6. The motorcycle backrest according to claim 1 wherein said releasable latch includes a spring-biased locking knob that removably seats within an aperture on said plate to secure said latch in a select position.

* * * * *